United States Patent
Li et al.

(10) Patent No.: US 9,239,231 B2
(45) Date of Patent: Jan. 19, 2016

(54) SYSTEMS FOR AND METHODS OF CHARACTERIZING THE THICKNESS PROFILE OF LAMINATED GLASS STRUCTURES

(71) Applicant: CORNING INCORPORATED, Corning, NY (US)

(72) Inventors: Ming-Jun Li, Horseheads, NY (US); Anping Liu, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/792,864

(22) Filed: Jul. 7, 2015

(65) Prior Publication Data

US 2015/0308814 A1 Oct. 29, 2015

Related U.S. Application Data

(62) Division of application No. 13/777,112, filed on Feb. 26, 2013, now Pat. No. 9,109,879.

(60) Provisional application No. 61/604,716, filed on Feb. 29, 2012.

(51) Int. Cl.
*G01J 1/58* (2006.01)
*G01B 11/06* (2006.01)
(Continued)

(52) U.S. Cl.
CPC ............ *G01B 11/0658* (2013.01); *G02B 5/208* (2013.01); *G02B 6/036* (2013.01)

(58) Field of Classification Search
CPC .................................................. G01B 11/0658

USPC .................................... 250/459.1, 458.1, 216
See application file for complete search history.

(56) References Cited

U.S. PATENT DOCUMENTS 4,323,785 A    4/1982  McComb et al.
4,532,429 A    7/1985  Horikawa
(Continued)

FOREIGN PATENT DOCUMENTS

CN          1645039 A    7/2005
JP       2000-221009 A    8/2000
(Continued)

OTHER PUBLICATIONS

Meyer, "Gradual Reflection of Short Waves", SIAM J. Appl. Math, vol. 29, No. 3, Nov. 1975.
(Continued)

*Primary Examiner* — David Porta
*Assistant Examiner* — Abra Fein
(74) *Attorney, Agent, or Firm* — Michael A. Hood (57) ABSTRACT

Systems for and methods of characterizing the thickness profile of laminated glass structures are disclosed, wherein the laminated glass structure has at least one gradual transition region between adjacent glass layers. The method includes sequentially focusing laser light at different focuses along a line within the laminated glass structure. The sequentially formed focuses define corresponding micro-volumes from which fluorescent light emanates due to a multiphoton process. The variation in the intensity of the detected fluorescent light from each micro-volume as a function of distance into the laminated glass structure is used to determine the relative locations of the multiple layers and the at least one gradual transition region.

20 Claims, 10 Drawing Sheets

(51) Int. Cl.
 *G02B 6/036* (2006.01)
 *G02B 5/20* (2006.01)

(56) References Cited

U.S. PATENT DOCUMENTS

| | | | |
|---|---|---|---|
| 4,880,453 A | 11/1989 | Coppola et al. |
| 5,034,613 A | 7/1991 | Denk et al. |
| 5,457,533 A | 10/1995 | Wilcken |
| 5,498,865 A | 3/1996 | Gaboury et al. |
| 5,604,582 A | 2/1997 | Rhoads et al. |
| 6,133,999 A | 10/2000 | Myers et al. |
| 6,683,695 B1 | 1/2004 | Simpson et al. |
| 6,962,670 B1 | 11/2005 | Hanson et al. |
| 7,292,745 B2 | 11/2007 | Dabby |
| 7,638,184 B2 | 12/2009 | Yaoita et al. |
| 7,776,670 B2 | 8/2010 | Yamashita et al. |
| 7,876,437 B1 | 1/2011 | Furnas et al. |
| 2004/0099823 A1 | 5/2004 | Abraham et al. |
| 2004/0239951 A1 | 12/2004 | Yamanishi et al. |
| 2004/0246493 A1 | 12/2004 | Kim et al. |
| 2006/0127679 A1 | 6/2006 | Gulati et al. |
| 2007/0002313 A1 | 1/2007 | Berg et al. |
| 2008/0050756 A1 | 2/2008 | Paul Kim et al. |
| 2009/0321895 A1 | 12/2009 | Yamashita et al. |
| 2011/0205540 A1 | 8/2011 | Moll |
| 2012/0060434 A1 | 3/2012 | Jacobs |
| 2012/0068083 A1 | 3/2012 | Labrot et al. |
| 2012/0127487 A1 | 5/2012 | Potapenko |
| 2012/0326055 A1 | 12/2012 | Wilson et al. |
| 2013/0221237 A1 | 8/2013 | Logunov |
| 2013/0221238 A1 | 8/2013 | Li et al. |

FOREIGN PATENT DOCUMENTS

| | | |
|---|---|---|
| JP | 03979790 B2 | 9/2007 |
| JP | 4157919 B2 | 10/2008 |
| JP | 2014-28730A A | 2/2014 |
| KR | 10-0867197 B1 | 11/2008 |
| WO | 2007/020791 A1 | 2/2007 |

OTHER PUBLICATIONS

Measuring Glass Thickness, dated Apr. 15, 2010, pp. 1-2, Designnews, available at http://www.designnews.com/document.asp?doc_id =229015.

SYSTEMS FOR AND METHODS OF CHARACTERIZING THE THICKNESS PROFILE OF LAMINATED GLASS STRUCTURES

CROSS-REFERENCE TO RELATED APPLICATIONS

This application is a divisional of and claims the benefit of priority under 35 U.S.C. §120 of U.S. application Ser. No. 13/777,112, filed on Feb. 26, 2013, which claims the benefit of priority under 35 U.S.C. §119 of U.S. Provisional Application No. 61/604,716, filed Feb. 29, 2012. The content of each of these applications is relied upon and incorporated herein by reference in its entirety.

FIELD

The present disclosure relates to characterizing glass structures, and in particular relates to systems for and methods of characterizing the thickness profile of laminated glass structures using fluorescence microscopy.

BACKGROUND

Certain types of glass structures such as glass sheets are fabricated using a lamination process that combines different layers of different types of glass. The lamination process can be such that the interfaces between the different glass layers become gradual. This can happen, for example, if the lamination process involves heat that gives rise to thermal diffusion that causes a gradient-index transition region between adjacent layers within the glass structure.

A gradual transition region between adjacent glass layers makes it difficult to use conventional methods for measuring glass-layer thicknesses that rely on a reflection from a relatively well-defined (i.e., sharp) internal interface. This is because the reflection of light from a gradually changing interface is typically too weak to be clearly detected. Further, modern-day glass-sheet manufacturing requires tight thickness control of each glass layer in the laminated glass structure. Such thickness control can require, for certain applications (e.g., screens for liquid crystal displays), a thickness measurement resolution of just a few microns. Such a measurement resolution cannot be obtained for glass structures having gradual transition regions between adjacent layers using the aforementioned conventional measuring techniques that rely upon reflection from a sharp interface between adjacent layers.

SUMMARY

The systems and methods disclosed herein utilize fluorescence microscopy to measure multiphoton fluorescence responses within small micro-volumes (e.g., in the range from 10 femtoliters to 3,500 femtoliters) within the body of a laminated glass structure. The laminated glass structure is made up of glass layers having at least one gradual transition region between adjacent glass layers. Fluorescence microscopy is described in U.S. Pat. No. 5,034,613.

The systems and methods disclosed herein make use of the fact that different glasses have different fluorescence responses to an intense laser beam. Once the laser beam intensity reaches a certain level (i.e., an intensity threshold), the multiphoton response that creates fluorescent light grows exponentially. For a laminated glass structure, scanning a focused laser beam downward into its layered body generates different fluorescence responses representative of the particular type of glass being irradiated. The back-scattered fluorescent light is collected and processed to generate a cross-sectional thickness profile that characterizes the particular laminated glass structure.

An aspect of the disclosure is a method of characterizing a thickness profile of a laminated glass structure having a first surface, a body comprising multiple layers and at least one gradual transition region between adjacent layers. The method includes focusing laser light of a first wavelength within the body of the laminated glass structure through the first surface at a surface location and sequentially at different focuses at different distances along a line into the body to cause an emission of fluorescent light of a second wavelength from respective micro-volumes within the body. The method also includes detecting an intensity of the fluorescent light for each of the micro-volumes. The method additionally includes determining relative locations of the multiple layers and the at least one gradual transition region based on a variation in the intensities of the detected fluorescent light as a function of the focus distances.

Another aspect of the disclosure is a method of characterizing a thickness profile of a laminated glass structure having a first surface, a body comprising multiple layers and at least one gradual transition region between adjacent layers. The method includes sequentially focusing laser light at different distances along a line that extends into the body with a light-focusing optical system to sequentially define micro-volumes. The focused laser light has sufficient intensity to cause fluorescent light to emanate from each micro-volume. The method also includes sequentially receiving the fluorescent light from each micro-volume with a light-collecting optical system. The method further includes sequentially detecting the sequentially received fluorescent light and forming corresponding electrical detector signals representative of respective intensities of the sequentially detected fluorescent light. The method additionally includes determining relative locations of the multiple layers and the at least one gradual transition region based on a variation in the intensities of the sequentially detected fluorescent light.

Another aspect of the disclosure is an apparatus for characterizing a thickness profile of a laminated glass structure having a first surface, a body comprising multiple layers and at least one gradual transition region between adjacent layers. The apparatus includes a first laser configured to emit first laser light. The apparatus also has a first light-focusing optical system arranged to receive the first laser light and form a first focus within the body that defines a first micro-volume and that causes first fluorescent light to emanate from the micro-volume. The apparatus also includes a first light-receiving optical system arranged to receive the first fluorescent light. The apparatus additionally includes a first photodetector configured to receive the first fluorescent light from the first light-receiving optical system, detect a first intensity of the first fluorescent light and generate a first electrical detector signal representative of the first detected intensity. The apparatus also includes a moveable stage configured to support the laminated glass structure so that the first focus can be moved to different distances into the body to irradiate different first micro-volumes therein and generate multiple first intensities of the first fluorescent light. The apparatus also includes a computer/controller configured to receive and process the first electrical detector signals and determine relative locations of the multiple layers and the at least one gradual transition region based on a first variation in the first intensities of the first detected fluorescent light from the first different micro-volumes.

These and other aspects of the disclosure will be further understood and appreciated by those skilled in the art by reference to the following specification, claims and appended drawings.

BRIEF DESCRIPTION OF THE DRAWINGS

A more complete understanding of the present disclosure can be had by reference to the following Detailed Description when taken in conjunction with the accompanying drawings, where.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

In some of the Figures, Cartesian coordinates are provided for the sake of reference and are not intended as limiting with respect to specific directions and orientations of the systems and methods described herein.

The claims as set forth below are incorporated into and constitute part of this detailed description.

The entire disclosure of any publication or patent document mentioned herein is incorporated by reference.

Figure 1:
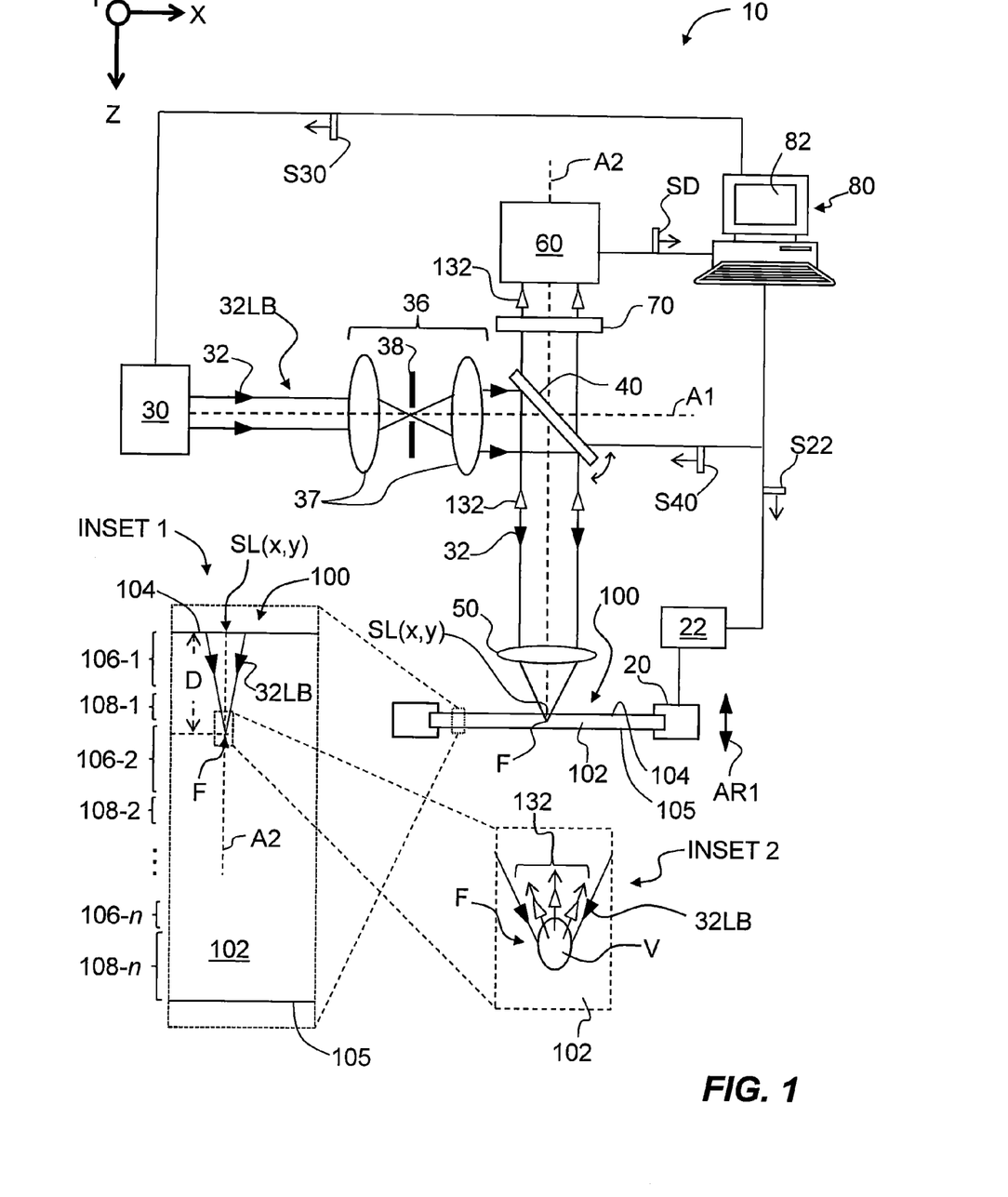
FIG. 1 is schematic diagram of an example embodiment of a fluorescence microscopy system suitable for carrying out methods of thickness profile measurement and characterization of the present disclosure.

FIG. 1 is a schematic diagram of an example fluorescence microscopy system 10 for characterizing the thickness profile of a laminated glass structure 100. As shown in the close-up inset view of INSET 1, laminated glass structure 100 has a body 102 having an upper surface 104 and a lower surface 105. An example laminated glass structure 100 is in the form of a sheet, as shown. A generalized location on upper surface 104 is denoted as SL(x,y). The body 102 is made up of two or more glass layers 106, with at least one gradual transition region 108 between adjacent layers.

FIG. 1 shows body 102 having a plurality of glass layers 106-1, 106-2, . . . 106-$n$ separated by a plurality of gradual transition regions 108-1, 108-2, . . . 108-$n$. The gradual transition region 108 has a smoothly varying (i.e., gradient) refractive index profile between the refractive indices of adjacent layers 106.

The system 10 includes a movable stage 20 configured to operably support laminated glass structure 100. The moveable stage 20 is operably connected to a stage driver 22 that directs the motion of the movable stage in response to a stage control signal S22. In an example, movable stage 20 can move laminated glass structure 100 in X-, Y- and Z-directions so that measurements can be taken at different surface locations SL(x,y). That is to say, thickness profiles can be obtained for different columns beneath respective surface locations SL(x, y), as described in greater detail in connection with FIG. 2, introduced and discussed below. Motion in the Z-direction is indicated by a double-ended arrow AR1.

With continuing reference to FIG. 1, system 10 includes, in order along a first optical axis A1, a laser 30 and a spatial-filter optical system 36. The laser 30 emits laser light 32, as schematically represented by the solid black arrowheads. The laser light 32 has a wavelength $\lambda_L$. The laser light 32 constitutes a laser beam 32LB that at times is collimated, divergent or convergent as it travels over its optical path from laser 30 to laminated glass structure 100. The laser beam 32LB includes a focus F as defined and discussed in greater detail below. The terms "laser light" and "laser beam" are used interchangeable herein and one skilled in the art will understand how these terms are used in different contexts.

The spatial-filter optical system 36 is configured to receive laser light 32 and spatially filter and collimate this light to remove high-frequency components that adversely affect the uniformity of laser beam 32LB. In an example, spatial-filter optical system 36 includes two positive lenses 37 with a pinhole aperture 38 arranged at their common focus (which defines the location of a Fourier plane) and serving as a high-frequency filter.

The system 10 also includes a second optical axis A2 that intersects first optical axis A1 at nominally a right angle. A beam splitter 40 is disposed at the intersection of first and second optical axes A1 and A2. The beam splitter 40 can be, for example, a fixed dichroic mirror or a scanning dichroic mirror. When beam splitter 40 comprises a fixed dichroic mirror, the laser beam focus F moves only in the Z-direction and thus provides only thickness information associated with a single surface location SL(x,y) of upper surface 104, i.e., provides a single column of data that corresponds to a single column of micro-volumes V (as introduced and discussed below; see FIG. 2) into body 102. This simple approach may be adequate for fast online monitoring for certain applications and situations. However, it may not provide the most accurate thickness profile or the highest resolution capability. With the size of laser beam 32LB being typically only several microns in diameter at focus F, any tiny defect inside body 102 may lead to a false signal indicating a layer boundary where in fact none exists.

This issue can be overcome by replacing a stationary (i.e., non-adjustable) beam splitter 40 with an adjustable (e.g., scanning) beam splitter, such as a scanning dichroic mirror. With a scanning beam splitter 40, a large area of laminated glass structure 100 can be measured and a cross-sectional profile can be generated that averages the data taken at different surface locations SL(x,y) of the laminated glass structure.

The system 10 also includes an objective lens 50, which is disposed along second optical axis A2 in the +Z-direction relative to beam splitter 40 and which resides near laminated glass structure 100. A photodetector 60 is arranged along second optical axis A2 in the −Z-direction relative to beam splitter 40. In an example, photodetector 60 is highly sensitive, e.g., comprises a photomultiplier tube.

The system 10 also includes an optical filter ("filter") 70 disposed along optical axis A2 in front of photodetector 60. The filter 70 is configured to pass (transmit) a fluorescent wavelength $\lambda_F$ and block (e.g., reflect or absorb) the laser wavelength $\lambda_L$ (with $\lambda_F < \lambda_L$). In an example embodiment, the laser wavelength $\lambda_L$ is in the aforementioned range from 700 nm to 1,700 nm, and the fluorescent wavelength $\lambda_F$ is at least 1.5 times shorter than the laser wavelength.

The spatial-filter optical system 36, beam splitter 40 and objective lens 50 constitute an example of a light-focusing optical system, while the objective lens, the beam splitter and filter 70 constitute an example of a light-receiving optical system. Other examples of the light-focusing optical system and light-receiving optical system are discussed below. In an example, the light-focusing optical system and the light-receiving optical system have at least one optical element in common and portions of their respective optical paths overlap.

The system 10 also includes a computer/controller 80 that is operably connected to stage driver 22, laser 30, beam splitter 40 and photodetector 60. In an example, computer/controller 80 includes a display 82. The computer/controller 80 is configured to store data, perform processing operations (e.g., calculations), and control the operation of system 10 in carrying out the methods described herein. In an example, computer/controller 80 includes data processing software embodied in a computer-readable medium, such as LabVIEW™ software or Matlab® software, that causes the computer/controller to process (e.g., analyze) and display fluorescence intensity data as a function of a distance D into body 102 of laminated glass structure 100. In an example, the data processing software in computer/controller 80 averages intensity measurement data taken at different surface locations SL(x,y) (e.g., $SL(x_1,y_1)$, $SL(x_2,y_2)$, $SL(x_3,y_3)$, . . . , or $SL(x_1,y_1)$, $SL(x_2,y_1)$, $SL(x_3,y_1)$, . . . , etc.).

The term "computer/controller" as the term is used herein is not limited to just those integrated circuits referred to in the art as computers, but broadly refers to computers, processors, microcontrollers, microcomputers, programmable logic controllers, workstations, application specific integrated circuits, and other programmable circuits (e.g., FPGAs), and their combinations.

With continuing reference to FIG. 1, in the operation of system 10, computer/controller 80, via a control signal S30, causes laser 30 to generate pulsed laser light 32, which is spatially filtered and collimated by spatial-filtering optical system 36. The laser light 32 is then incident upon beam splitter 40, which directs the collimated laser light to travel along axis A2 in the +Z-direction. The direction of collimated laser light 32 can be adjusted by rotation of beam splitter 40 via a control signal S40 from computer/controller 80. The collimated laser light 32 from beam splitter 40 is received by objective lens 50, which brings the light to focus F at a select distance D within body 102 of glass structure 100 as measured in the +Z-direction from upper surface 104. The particular distance D (and in general, the (x,y,z) position of the stage) is controlled by computer/controller 80 sending control signal S22 to stage driver 22, which in turn places stage 20 in the appropriate location. The focus F is associated with a corresponding surface location SL(x,y), i.e., the two lie generally along optical axis A2.

With reference also to the close-up view of INSET 2 of FIG. 1, the focused pulsed laser light 32 creates a multiphoton excitation with a small volume (hereinafter, microvolume) V of body 102 of glass structure 100 at focus F. This results in the subsequent emission of fluorescent light 132 (indicated by the white arrowheads) from micro-volume V, with the fluorescent light having the aforementioned fluorescent wavelength $\lambda_F$. The Z-position of focus F is varied sequentially along a line (i.e., in a select direction, such as the Z-direction) that extends into body 102 from upper surface 104. This serves to sequentially define micro-volumes through body 102 along the line (e.g., second optical axes A2) with a fixed (x,y) position corresponding to surface location SL(x,y).

Figure 2:
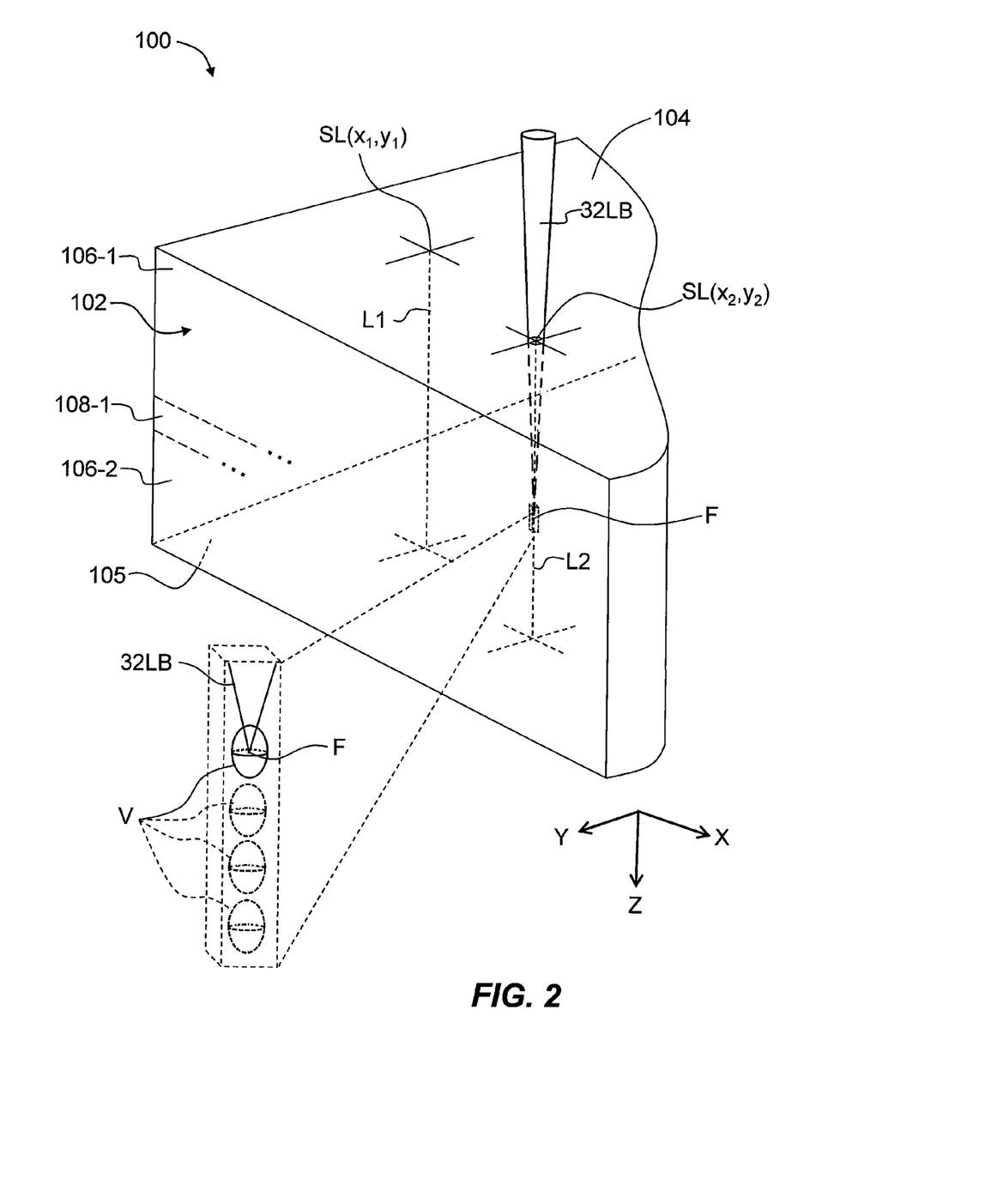
FIG. 2 is a close-up, cut-away perspective view of an example laminated glass structure, showing how thickness profile measurements are made along different lines that extend into the body of the laminated glass structure, and also showing in a close-up inset an example of sequentially formed micro-volumes.

FIG. 2 is a close-up cut-away perspective view of an example laminated glass structure 100, showing how measurements are made along different lines L1, L2 extending into the body of the laminated glass structure from upper surface 104 from different surface locations $SL(x_1, y_1)$ and $SL(x_2,y_2)$. FIG. 2 also includes a close-up inset of an example of sequentially formed micro-volumes V. The micro-volumes V that are still to be formed are shown as dashed lines and lie on line L2 right below the solid-line micro-volume formed by focus F of focused laser light beam 32LB. FIG. 2 also shows two glass layers 106-1 and 106-2 separated by a gradual transition region 108-1.

In the case of two-photon excitation of a fluorophore in micro-volume V of body 102, the fluorescent photon typically has a higher energy and thus shorter wavelength $\lambda_F$ than the excitation photons from the laser light of wavelength $\lambda_L$.

Many glass fluorophores have excitation spectra in the 400 nm to 500 nm range, which allows the use of commonly available lasers operating in the 700 nm to 1,000 nm (near-infrared) range for two-photon excitation. When the fluorophore absorbs two infrared photons simultaneously, it will have enough energy to be raised to the excited state. The fluorophore will then emit a single photon at a wavelength $\lambda_F$, typically in the visible spectrum. Because two photons of laser light 32 are absorbed during the excitation of the fluorophore, the probability of fluorescent emission of fluorescent light 132 from the fluorophore increases quadratically with the excitation intensity of the laser light.

To enhance two-photon fluorescence within body 102 of glass structure 100, objective lens 50 is used to bring laser light beam 32LB to the aforementioned focus F. The focus F serves to define a diameter of laser light beam 32LB that in an example embodiment is in the range from 1 micron to 10 microns. As a result, the fluorescent excitation is restricted to the aforementioned micro-volume V, thereby resulting in a highly localized emission of fluorescent light 132. This tight localization of the fluorophore excitation provides a substantial advantage as compared to single-photon excitation microscopes (e.g., confocal microscopes), which need to employ additional elements, such as pinholes, to reject out-of-focus fluorescent light.

With continuing reference to FIG. 1, fluorescent light 132 emitted from micro-volume V in body 102 is collected by objective lens 50 and directed through beam splitter 40 and through filter 70 to photodetector 60. Since the fluorescence wavelength $\lambda_F$ is shorter than the laser wavelength $\lambda_L$, filter 70 can be configured as a short-pass filter that blocks laser light 32 from reaching photodetector 60. The filter 70 can have different filtering properties, depending on the nature of the laminated glass structure 100 that needs to be characterized. For example, a simple short-pass filter may work very well to distinguish between three glass layers 106 in the case where only one of the glass layers has a strong fluorescence.

However, when glass layers 106 have a similar fluorescence, a dedicated filter 70 designed to block one fluorescence spectra as well as the laser wavelength may be beneficial. The filter 70 can also be in the form of or otherwise include a spectral analyzer or monochromator configured to selectively allow a desired fluorescence wavelength $\lambda_F$ to pass. In some cases, filter 70 can comprise a standard thin-film-based filter in combination with a monochromator or spectral analyzer configured to provide additional filtering.

The fluorescent light 132 that passes through filter 70 is detected by photodetector 60, which converts the light into an electrical photodetector signal SD representative of the detected intensity. The detected intensity represents one image voxel of body 102, with the voxel size corresponding to the size of micro-volume V. The computer/controller 80 receives electrical photodetector signal SD and in an example stores the information for further processing after all the fluorescence intensity data are collected.

The computer/controller 80 controls the operation of system 10 (e.g., via control signal S22 provided to stage driver 22) so that stage 20 moves glass structure 100 in the −Z-direction (i.e., upward toward objective lens 50). This allows for focus F to scan through body 102 in the +Z-direction in a sequential manner to sequentially form micro-volumes V along a line, where each micro-volume generates fluorescent light 132 (i.e., a fluorescent signal) that will typically vary as a function of distance into body 102. The collected fluorescent light 132 from each micro-volume V defines the aforementioned voxels, with each voxel having a corresponding intensity. Thus, the intensity data includes four components: the intensity value I and the (x,y,z) location of micro-volume V. This is the same as saying that each voxel is defined by I(x,y,z).

The intensity data (i.e., the collection of voxels) is then used to form an image of body 102 as a function of distance D into the body. Pixels can be formed from the voxels by collapsing the three-dimensional voxel in one or two dimensions. The resulting image constitutes a cross-sectional thickness profile of body 102 of glass structure 100 that serves to characterize the various layers 106 and the at least one gradual transition region 108 therein.

The laser 30 is configured to provide laser light 32 having sufficient power to generate the multiphoton fluorescence. Example lasers 30 include Ti:Sapphire lasers, fiber lasers, and diode-pumped solid-state lasers. Example laser wavelengths $\lambda_L$ are in the range from 700 nm to 1,700 nm, with a pulse duration in the range from tens of femtoseconds to hundreds of picoseconds. Example pulse repetition rates are between several kHz to several hundreds of MHz. Conventional frequency conversion techniques, such as second harmonic generation, frequency mixing, optical parametric oscillation, etc. may be used to convert an initial laser wavelength to a final laser wavelength $\lambda_L$ that falls within a desired range to achieve optimum system performance.

Figure 3:
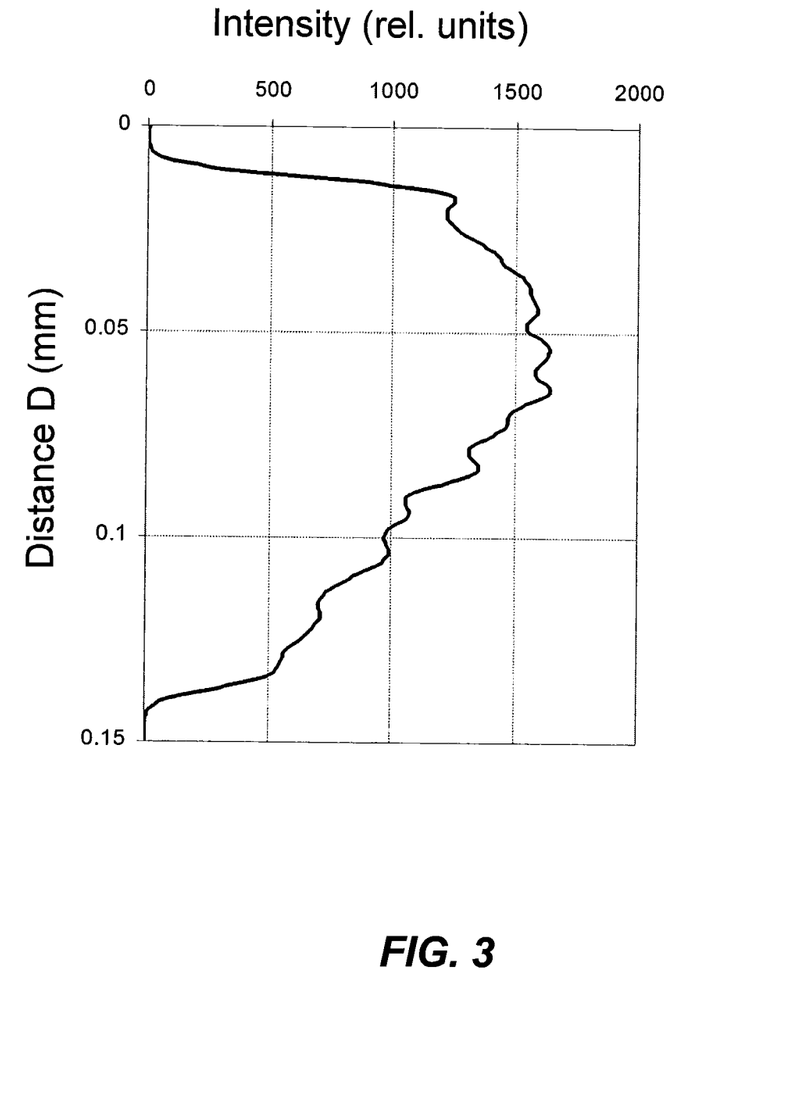
FIG. 3 plots the distance D (mm) vs. the relative intensity (relative units) of measurements taken using the system of FIG. 1 on a conventional monolithic microscope cover glass.

FIG. 3 plots the distance D (mm) vs. the relative intensity (relative units) of measurements taken using system 10 of FIG. 1 on a conventional monolithic microscope cover glass. Intensity measurements were taken at a number of surface locations SL(x,y) and then averaged in computer/controller 80. The measurement of this type of non-laminated sample was performed to see if the thickness profile would accurately characterize the body of the cover glass as not having any internal layers. The thickness profile of FIG. 3 shows a relatively smooth fluorescence intensity curve from the upper surface (at D=0) to the lower surface (at about 0.145 mm), thereby confirming that there are no internal layers within the monolithic body of the microscope cover glass.

Figure 4:
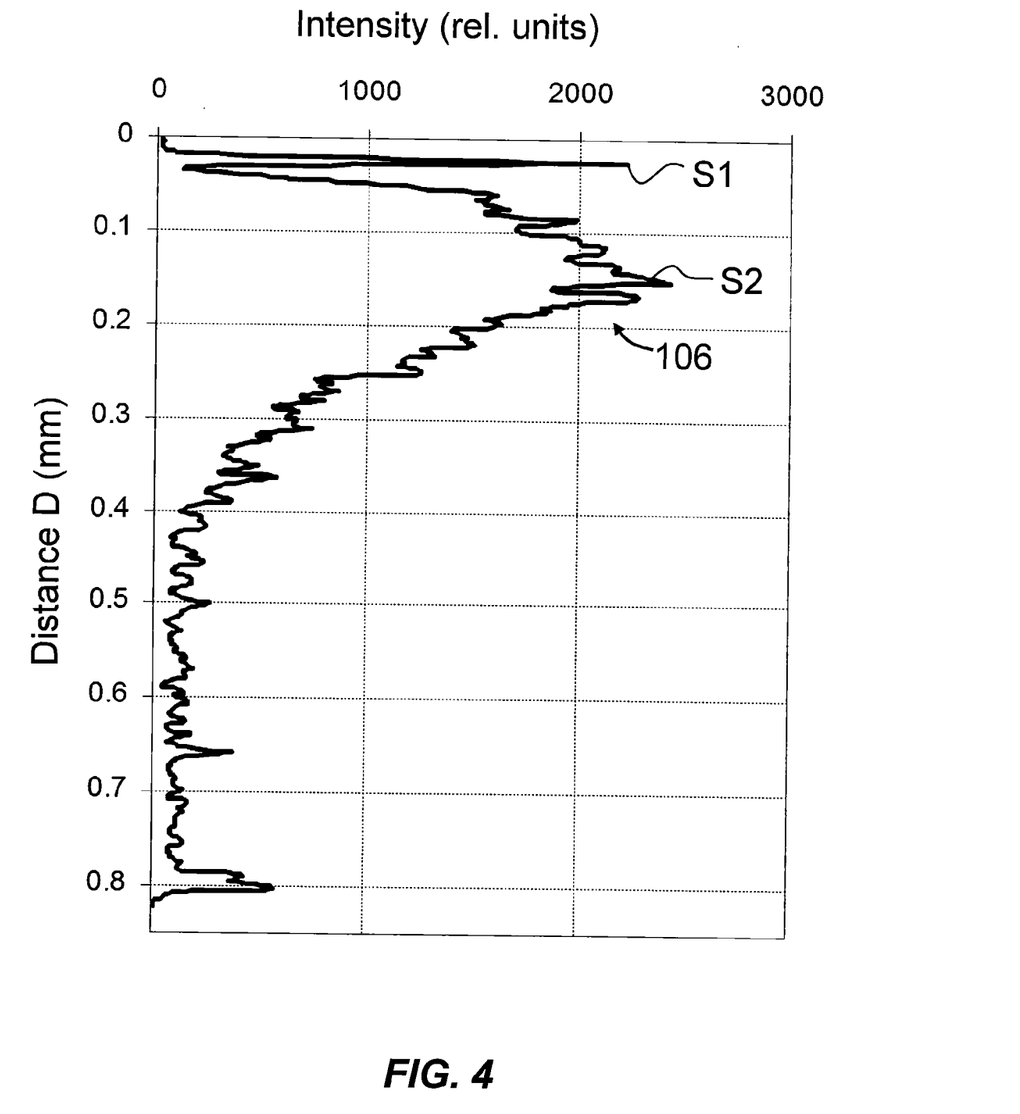
FIG. 4 is a plot similar to FIG. 3, but for a laminated glass structure made of two different glasses.

FIG. 4 is a plot similar to FIG. 3, but for a laminated glass structure 110 made of two different glass layers 106. The strong signal S1 adjacent upper surface 104 (Distance D=0) indicates the existence of some contaminations, such as particles, dust or/and organic matters. A strong signal S2 arises at a depth of about 25 microns and indicates a glass layer 106 with a thickness of about 20 microns to 25 microns that is different from the core. The intensity signal becomes weaker after reaching the depth D=250 microns, but it can be improved using a higher power laser.

Figure 5:
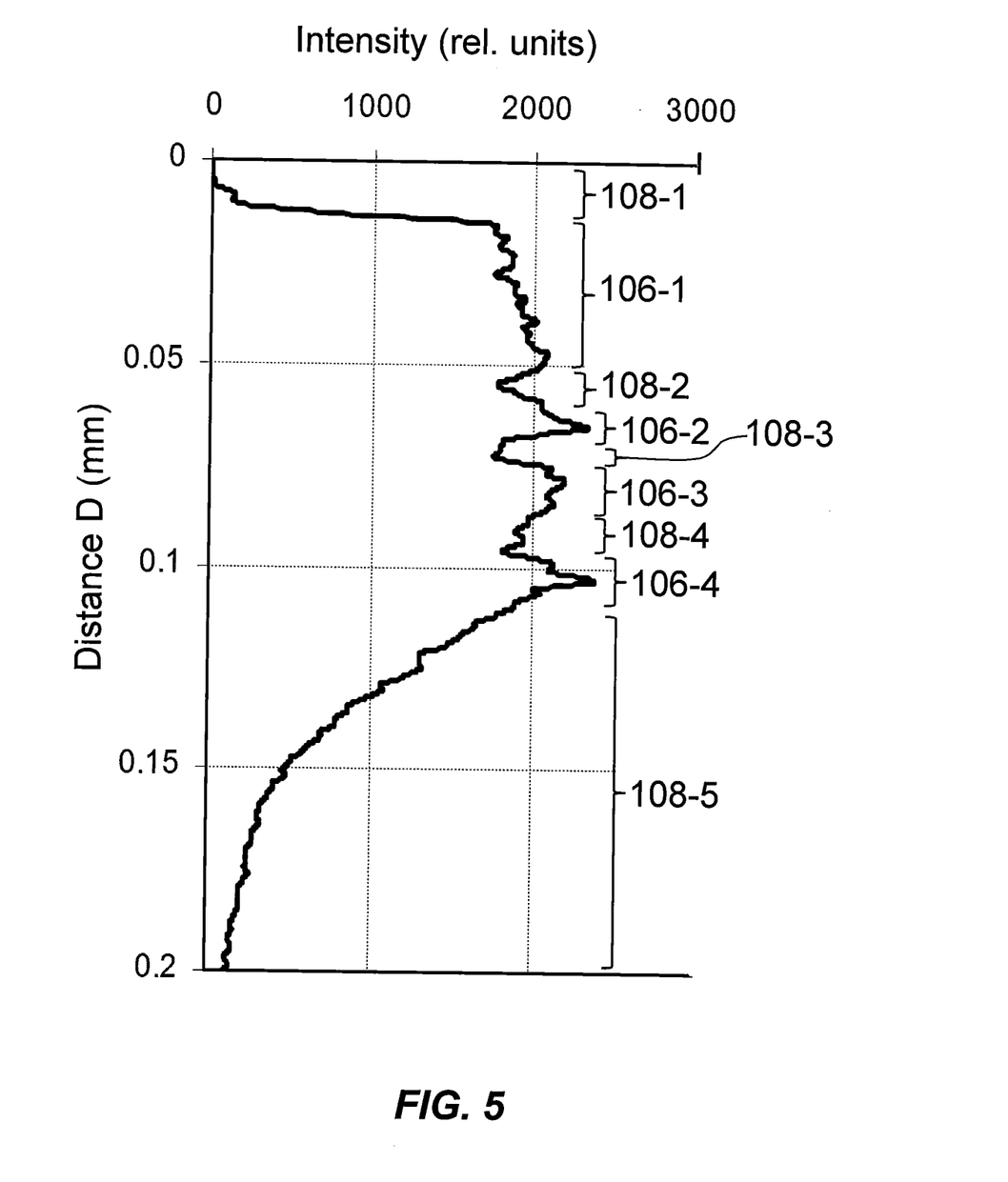
FIG. 5 is a plot similar to FIG. 4, but for a laminated glass structure made of four glass layers.

FIG. 5 is a plot similar to FIG. 4 for an example laminated glass structure 100. The plot reveals four glass layers 106-1 through 106-4 along with five transition regions 108-1 through 108-5. Although it is not clear whether glass layers 106 are made of different materials, the different glass layers 106 are distinct, as are the gradual transition regions 108 between adjacent glass layers.

Figure 6:
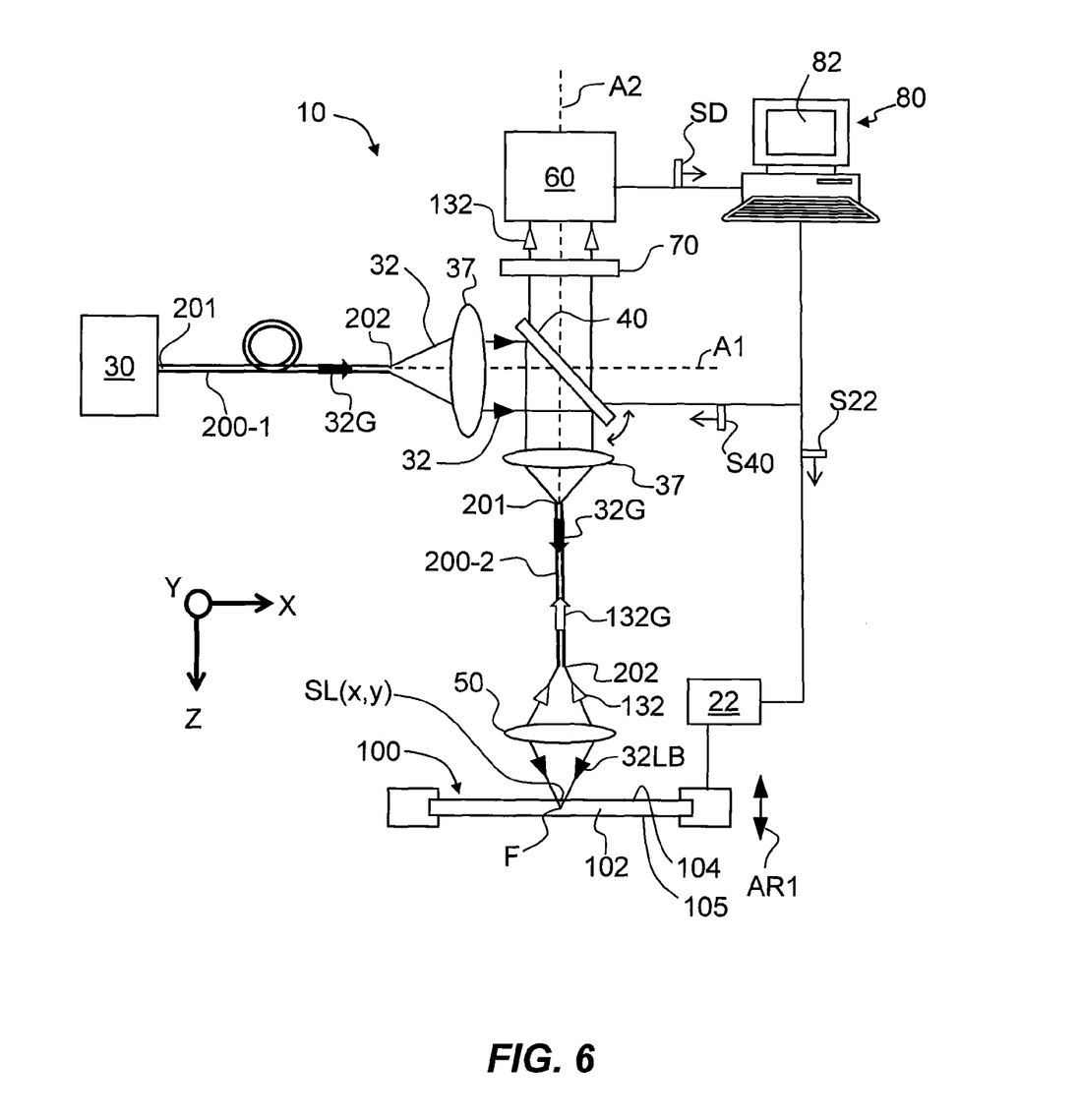
FIG. 6 is similar to FIG. 1 and illustrates an alternate embodiment of the system that employs an optical-fiber-based configuration.

FIG. 6 is similar to FIG. 1 and illustrates an alternate embodiment of system 10 that employs an optical-fiber-based configuration. In system 10 of FIG. 6, laser 30 includes two optical fibers 200, denoted as first and second optical fibers 200-1 and 200-2. Each optical fiber 200 has opposite ends 201 and 202. In an example, at least first optical fiber 200-1 is single mode at laser wavelength $\lambda_L$. The laser 30 comprises either a fiber laser or a conventional laser with an optical fiber output. An example range for the laser wavelength $\lambda_L$ is from 700 nm to 1,600 nm.

In system 10 of FIG. 6, first optical fiber 200-1, lenses 37, beam splitter 40, second optical fiber 200-2, and objective lens 50 constitute an example light-focusing optical system, while the objective lens, second optical fiber 200-2, the lens 37 lying along second optical axis A2, the beamsplitter and filter 70 constitute an example light-receiving optical system.

The laser light 32 travels in first optical fiber 200-1 as guided laser light 32G. This light emanates from optical fiber end 202 of first optical fiber 200-1 as divergent laser light 32. This divergent laser light 32 is then collimated by lens 37. The collimated laser light 32 is then directed by beam splitter 40 to another lens 37 that focuses the laser light onto end 201 of second optical fiber 200-2. The focused laser light 32 thus travels in second optical fiber 200-2 as guided laser light 32G. This guided laser light 32G then emanates from optical end 202 of the second optical fiber 200-2 and is then focused by objective lens 50 to focus F.

The fluorescent light 132 emanating from the corresponding micro-volume V of focus F within body 102 of laminated glass structure 100 is collected by objective lens 50 and is focused onto end 202 of second optical fiber 200-2 so that the fluorescent light travels therein as guided fluorescent light 132G. This guided fluorescent light 132G emanates from end 201 of second optical fiber 200-2 as diverging fluorescent light 132, which is then collimated by the lens 37 adjacent the optical fiber end. From this point on, the operation of system 10 of FIG. 6 is the same as that of FIG. 1 described above.

The example optical-fiber-based configuration of system 10 of FIG. 6 eliminates bulky free-space optics and thus significantly reduces the system size. In addition, the use of fiber-based components greatly improves device robustness and makes it suitable for mass production.

Figure 7:
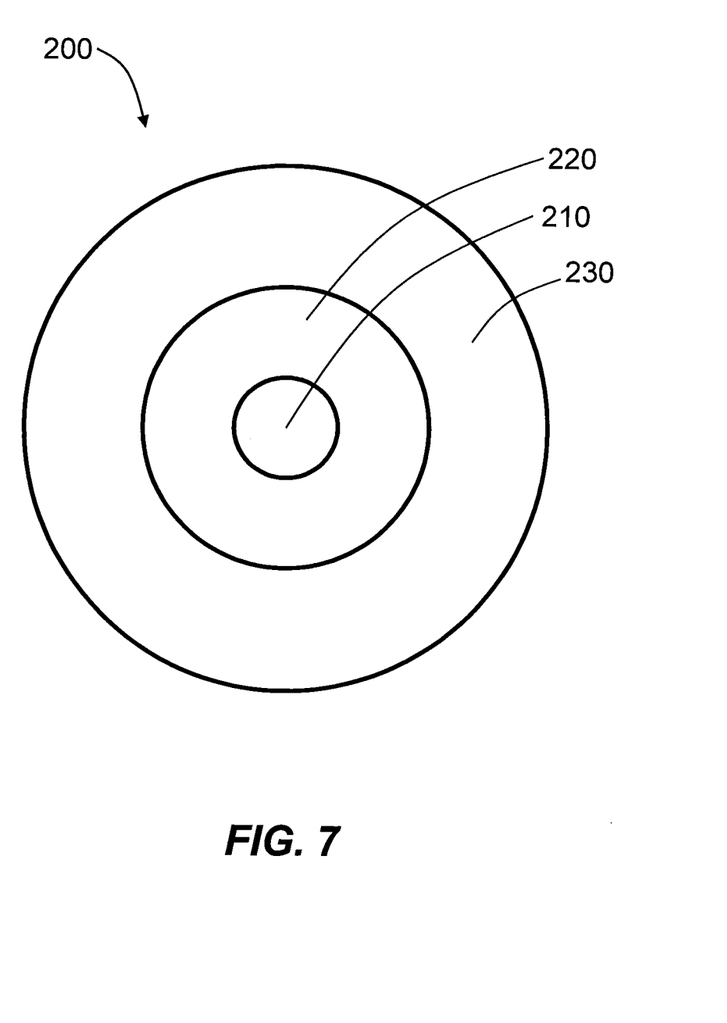
FIG. 7 is a cross-sectional view of an example double-cladding optical fiber that can be used in the system of FIG. 6.

With reference to the cross-sectional view of FIG. 7, an example optical fiber 200 comprises a double-cladding optical fiber having a core 210, an inner cladding 220 immediately surrounding the core, and an outer cladding 230 immediately surrounding the inner cladding. Example double-cladding optical fibers suitable for use as optical fiber 200 are disclosed in U.S. Pat. No. 7,590,324. The core 210 is used to carry (deliver) guided laser light 32G while the large-size (large area) inner cladding 220 is used to carry (deliver) guided fluorescent light 132G. In an example, core 210 is single mode at the laser wavelength $\lambda_L$ so that optical fiber 200 provides a uniform output laser beam 32LB and in a sense acts as a spatial filter, thereby obviating the need for spatial-filter optical system 36.

An example value for the delta (Δ) of core 210 of double-cladding optical fiber 200 is in the rage of 0.1% to 0.4%, and an example core radius is in the range 2 microns to 5 microns. The inner cladding 220 has a relatively high numerical aperture (NA) and large diameter to efficiently collect fluorescent light 132. In respective examples, the NA of inner cladding 220 is greater than 0.2, or greater than 0.3, while the diameter is greater than 100 microns, or greater than 200 microns.

Double-cladding optical fiber 200 allows for the size of laser beam 32 at focus F to be kept small, e.g., several microns or less in diameter, without compromising fluorescence collecting efficiency because inner cladding 220 has a relatively high NA and a large diameter. It also reduces the design requirements on objective lens 50, e.g., the objective lens does not need to be fully corrected for chromatic aberration.

Figure 8:
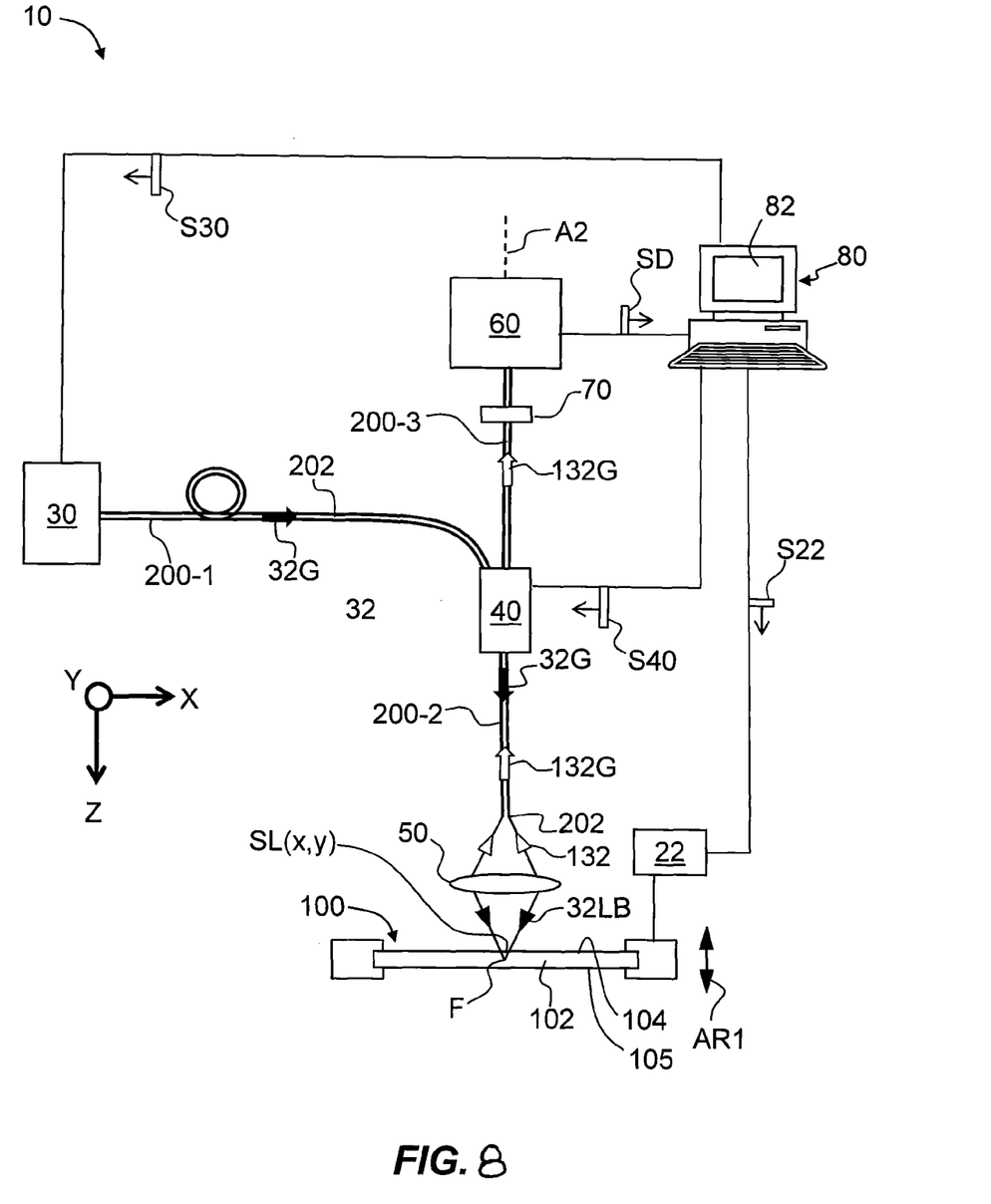
FIG. 8 is similar to FIG. 6 and shows another example embodiment of an optical-fiber-based system that employs a fiber optic coupler as the beam splitter.

FIG. 8 is similar to FIG. 6 and shows an example optical-fiber-based system 10 wherein beam splitter 40 is a fiber-based beam splitter, i.e., a fiber optic coupler, and a third optical fiber 200-3 is employed between the beam splitter and photodetector 60 as shown. Now system 10 is essentially all-fiber except for objective lens 50. The all-fiber configuration makes system 10 more compact and reliable. The beam splitter 40 can be made using a conventional fiber fusion process whereby a multimode second optical fiber 200-2 is attached to cladding 210 of third optical fiber 200-3 so that a signal in the cladding 220 of the second optical fiber 200-2 is coupled into the third optical fiber. In this case, the structure of core 210 does not change and so has no impact on the high-intensity guided laser light 32G traveling inside optical fiber core 210.

In system 10 of FIG. 8, first optical fiber 200-1, beam splitter 40, second optical fiber 200-2 and objective lens 50 constitute an example light-focusing optical system, while the objective lens, the second optical fiber, the beamsplitter, third optical fiber 200-3 and filter 70 constitute an example light-receiving optical system.

For an all-fiber system 10 such as is shown in FIG. 8, the thickness profile of laminated glass structure 100 can be obtained by either axially scanning second optical fiber 200-2 or by axially scanning objective lens 50. Axially scanning second optical fiber 200-2 may prove more desirable because this scanning is typically easier to implement. With a piezo-electric actuator (not shown), end 202 of second optical fiber 200-2 can be moved rapidly. To achieve a large-depth scan, however, a combination of both fiber and objective lens axial scanning can be employed. Lateral scanning to perform measurements at different surface locations SL(x,y) can be accomplished by laterally moving end 202 of second optical fiber 200-2, while the depth scanning is achieved by axially moving the objective lens 50 (i.e., in the Z-direction).

Figure 9:
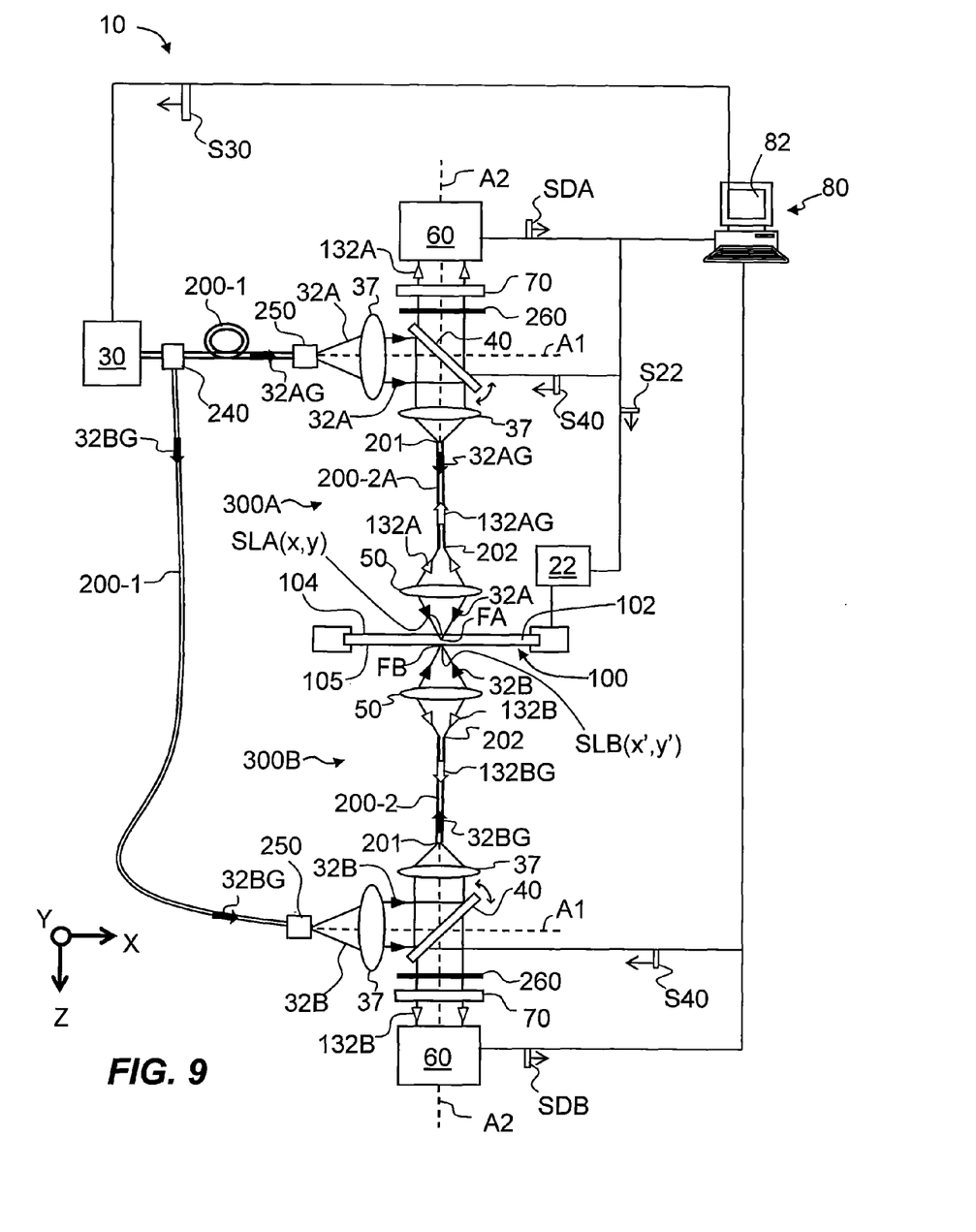
FIG. 9 is similar to FIG. 6, and shows an example embodiment of a bi-directional system that allows for a laminated glass structure to be characterized through both the upper and lower surfaces simultaneously via respective first and second measurement arms.

FIG. 9 is similar to FIG. 6 and shows an example embodiment of bi-directional system 10 that allows for laminated glass structure 100 to be characterized through both upper and lower surfaces 104 and 105 simultaneously via respective first and second measurement arms 300A and 300B. The first and second measurement arms 300A and 300B provide respective detector signals SDA and SDB to computer/controller 80 from their respective detectors 60. Such a configuration is useful for example when laminated glass structure 100 is relatively thick, e.g., 2 mm or thicker. At such thicknesses, off-the-shelf lasers may not provide sufficient power to penetrate all the way to lower surface 105 with sufficient intensity. Likewise, glass layers 106 that are highly scattering can be problematic when attempting to make a measurement just through one surface.

Thus, in system 10 of FIG. 9, guided laser light 32G is divided via a fiber coupler 240 to travel into two first optical fibers 200-1 respectively associated with first and second measurement arms 300A and 300B as guided laser light 32AG and 32BG, respectively. The two measurement arms 300A and 300B operate as described above in connection with FIG. 6 so that each measurement arm forms respective foci FA and FB via respective laser light 32A and 32B, and then detects the corresponding fluorescent light 132A and 132B, which emanates from body 102 in opposite directions.

In an example, measurement arm 300A makes a measurement at a surface location SL(x,y)=SLA(x,y) of upper surface 104 while measurement arm 300B makes a measurement at a surface location SLB(x',y'). In an example, surface locations SLA(x,y) and SLB(x',y') are the same, i.e., x=x' and y=y' so that the locations are axially aligned through body 102 and are offset only in the Z-direction (i.e., so that the respective second optical axes A2 of measurement arms 300A and 300B are co-linear). In another example, surface locations SLA(x, y) and SLB(x',y') are different, i.e., x≠x' and y≠y'. Note that the primed Cartesian coordinate system is the same as the unprimed Cartesian coordinate system except that it is displaced in the Z-direction.

In an example embodiment, to avoid interference between fluorescent light 132 from the different measurement arms 300A and 300B, the polarizations of the measurement arms are made orthogonal, e.g., via polarization controllers 250 (which in an example can comprise simple polarizers). This allows for polarizers 260 to be arranged adjacent the respective photodetectors 60 so that they block polarized fluorescent light 132 from the other measurement arm.

Figure 10:
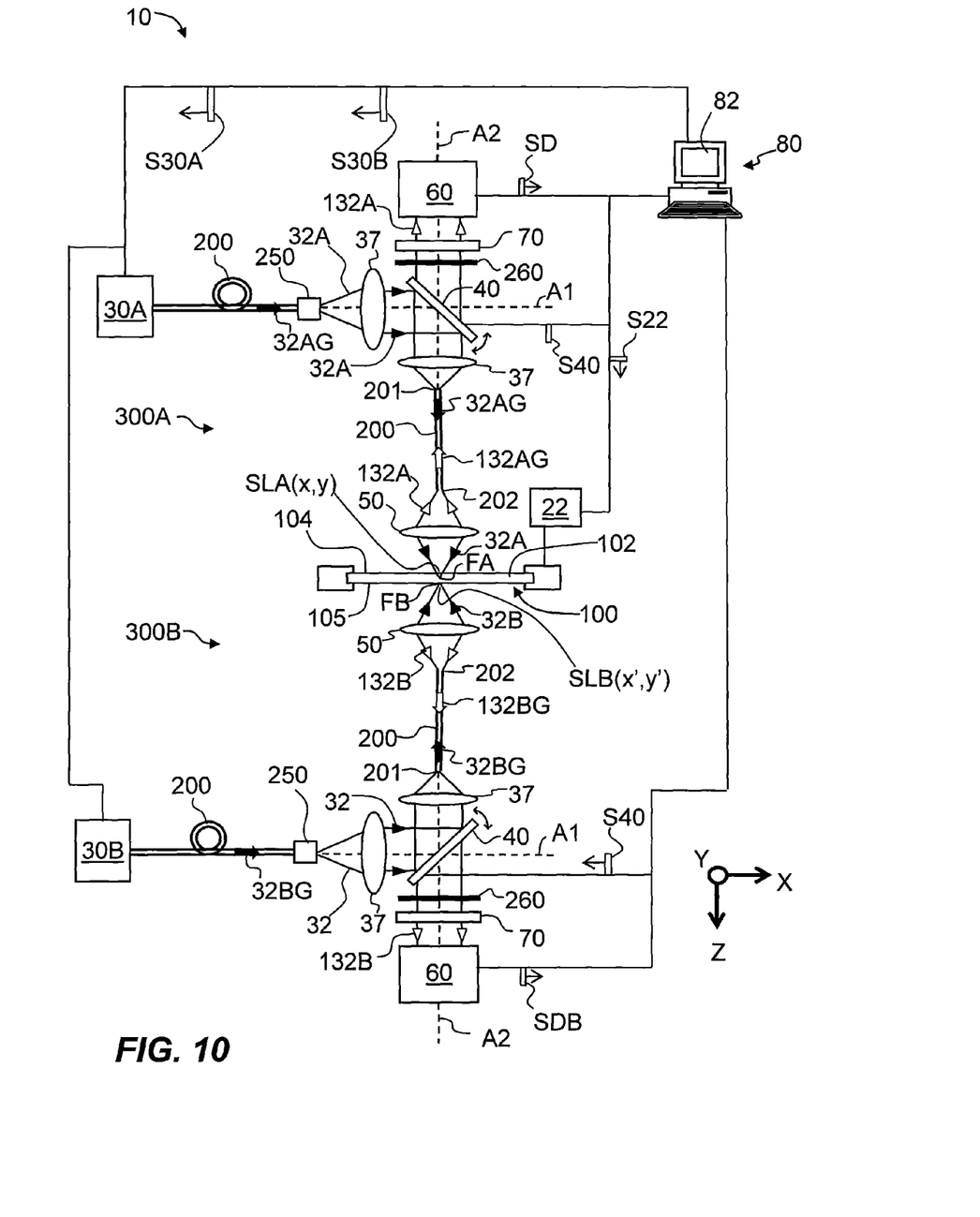
FIG. 10 is similar to FIG. 9 and illustrates an example embodiment of a bi-directional system that employs two separate lasers.

A similar bi-direction approach to system 10 is shown in FIG. 10 and employs two separate lasers 30A and 30B rather than a single laser 30 from which to split off the laser light 32. The separate lasers 30 (denoted 30A and 30B) are controlled by respective control signals S30A and S30B from computer/controller 80. The use of two separate lasers 30A and 30B allows for either a greater amount of optical power to be used in each measurement arm, or alternatively allows for using two lasers having less power than a single, high-power laser.

The systems and methods set forth here have a number of advantages. A first advantage is that they can characterize a thickness profile to a resolution R as small as 0.5 microns because only a small micro-volume V of body 102 of laminated glass structure 100 is made to fluoresce at a given time. A second advantage is that the thickness profile can be characterized very quickly. The laser 30 can have a pulse duration of over tens of femtoseconds to hundreds of picoseconds at a megahertz repetition rate. Thus, the measurement time can be very short, e.g., less than 1 second to scan a laminate glass structure 100 having a thickness of 1 mm. The systems can also be made portable, especially when fiber-based.

In addition, the system and methods described herein can be used in thin-sheet glass manufacturing by feeding back the thickness profile information into the manufacturing process so that the glass sheet thickness profile can be precisely controlled.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A system for characterizing a thickness profile of a laminated glass structure having a body comprising multiple layers, the system comprising:
    a laser configured to emit laser light;
    a light-focusing system configured to focus the laser light on a micro-volume within the body to cause fluorescent light to emanate from the micro-volume, the micro-volume having a volume in a range from 10 femtoliters to 3,500 femtoliters;
    a photodetector configured to detect an intensity of the fluorescent light and generate a detector signal representative of the detected intensity; and
    a controller configured to determine relative locations of the multiple layers based on the detector signal.

2. The system of claim 1, wherein the detector signal is representative of different detected intensities corresponding to different micro-volumes at different depths within the body.

3. The system of claim 1, further comprising a moveable stage configured to move the laminated glass structure relative to the light focusing system to focus the laser light on different micro-volumes within the body.

4. The system of claim 1, wherein the light-focusing system is configured to focus the laser light on different micro-volumes at different depths within the body.

5. The system of claim 1, wherein the light-focusing system comprises a spatial-filter optical system or a single-mode optical fiber.

6. The system of claim 1, wherein the light-focusing system comprises a double-cladding optical fiber comprising a core and an inner cladding and configured to carry the laser light within one of the core or the inner cladding and carry the fluorescent light in the other of the core or the inner cladding.

7. The system of claim 1, wherein the light-focusing system forms a focus having a diameter in a range of 1 micron to 10 microns.

8. The system of claim 1, wherein the laser light has a first wavelength in a range of 700 nm to 1,700 nm, and the fluorescent light has a second wavelength that is shorter than the first wavelength.

9. The system of claim 1, wherein the controller is configured to determine the relative locations of the multiple layers to a resolution R in a range of 0.5 micron to 5 microns.

10. The system of claim 1, further comprising:
    a second light-focusing system configured to focus second laser light on a second micro-volume within the body to cause second fluorescent light to emanate from the second micro-volume; and
    a second photodetector configured to detect a second intensity of the second fluorescent light and generate a second detector signal representative of the second detected intensity;
    wherein the controller is configured to determine the relative locations of the multiple layers based on the second detector signal.

11. The system of claim 10, wherein the light-focusing system and the second light-focusing system are arranged such that the light-focusing system is configured to focus the laser light through a first surface of the laminated glass structure and the second light-focusing system is configured to focus the second laser light through a second surface of the laminated glass structure opposite the first surface.

12. A system for characterizing a thickness profile of a laminated glass structure having a body comprising multiple layers, the system comprising:
    a laser configured to emit laser light;
    a light-focusing system configured to focus the laser light on a micro-volume within the body to cause fluorescent light to emanate from the micro-volume, the light-focusing system comprising a double-cladding optical fiber comprising a core and an inner cladding and configured to carry the laser light within one of the core or the inner cladding and carry the fluorescent light in the other of the core or the inner cladding;
    a photodetector configured to detect an intensity of the fluorescent light and generate a detector signal representative of the detected intensity; and
    a controller configured to determine relative locations of the multiple layers based on the detector signal.

13. The system of claim 12, wherein the detector signal is representative of different detected intensities corresponding to different micro-volumes at different depths within the body.

14. The system of claim 12, wherein the double-cladding optical fiber comprises the core, the inner cladding immediately surrounding the core, and an outer cladding immediately surrounding the inner cladding.

15. The system of claim 12, wherein the laser light is carried in the core and the fluorescent light is carried in the inner cladding.

16. The system of claim 12, wherein the light-focusing system forms a focus having a diameter in a range of 1 micron to 10 microns.

17. The system of claim 12, wherein the micro-volume has a volume in a range from 10 femtoliters to 3,500 femtoliters.

18. The system of claim 12, wherein the laser light has a first wavelength in a range of 700 nm to 1,700 nm, and the fluorescent light has a second wavelength that is shorter than the first wavelength.

19. The system of claim 12, wherein the controller is configured to determine the relative locations of the multiple layers to a resolution R in a range of 0.5 micron to 5 microns.

20. A system for characterizing a thickness profile of a laminated glass structure having a body comprising multiple layers, the system comprising:
    a laser configured to emit laser light;
    a light-focusing system configured to focus the laser light on a micro-volume within the body to cause fluorescent light to emanate from the micro-volume;
    a photodetector configured to detect an intensity of the fluorescent light and generate a detector signal representative of the detected intensity; and
    a controller configured to determine relative locations of the multiple layers to a resolution R in a range of 0.5 micron to 5 microns based on the detector signal.

* * * * *